US008184798B2

(12) United States Patent
Wiatrowski et al.

(10) Patent No.: US 8,184,798 B2
(45) Date of Patent: May 22, 2012

(54) METHODS, SYSTEMS AND COMPUTER PROGRAM PRODUCTS FOR ACCESSING NUMBER PORTABILITY (NP) AND E.164 NUMBER (ENUM) DATA USING A COMMON NP/ENUM DATA LOCATOR STRUCTURE

(75) Inventors: Maria A. Wiatrowski, Raleigh, NC (US); Rohini Marathe, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1262 days.

(21) Appl. No.: 11/605,837

(22) Filed: Nov. 29, 2006

(65) Prior Publication Data
US 2007/0286379 A1    Dec. 13, 2007

Related U.S. Application Data

(60) Provisional application No. 60/813,309, filed on Jun. 13, 2006.

(51) Int. Cl.
*H04M 7/00* (2006.01)
*H04L 12/66* (2006.01)

(52) U.S. Cl. ............................. 379/221.13; 370/352

(58) Field of Classification Search ............ 370/352, 370/392; 379/221.13, 219
See application file for complete search history.

(56) References Cited

U.S. PATENT DOCUMENTS

| | | | |
|---|---|---|---|
| 4,819,156 A | 4/1989 | DeLorme et al. | |
| 6,049,714 A | 4/2000 | Patel | |
| 6,097,960 A | 8/2000 | Rathnasabapathy et al. | |
| 6,377,674 B1 | 4/2002 | Chong et al. | |
| 6,434,144 B1 | 8/2002 | Romanov | |
| 6,539,077 B1 | 3/2003 | Ranalli et al. | |
| 6,577,723 B1 | 6/2003 | Mooney | |
| 6,748,057 B2 | 6/2004 | Ranalli et al. | |
| 6,775,737 B1 | 8/2004 | Warkhede et al. | |
| 6,836,477 B1 | 12/2004 | West, Jr. et al. | |
| 6,839,421 B2 | 1/2005 | Ferraro Esparza et al. | |

(Continued)

FOREIGN PATENT DOCUMENTS
EP    0 669 771 A1    8/1995
(Continued)

OTHER PUBLICATIONS

Notification of Transmittal of the International Search Report and Written Opinion of the International Searching Authority, or the Declaration corresponding to PCT application No. PCT/US07/13732 (Jan. 29, 2008).

(Continued)

*Primary Examiner* — Ahmad Matar
*Assistant Examiner* — Sonia Gay
(74) *Attorney, Agent, or Firm* — Jenkins, Wilson, Taylor & Hunt, P.A.

(57) ABSTRACT

According to one aspect, the subject matter described herein comprises methods, systems, and computer program products for accessing number portability (NP) and E.164 number (ENUM) data in a combined NP/ENUM database. One method includes receiving a query including a telephone number (TN). A common NP/ENUM data locator structure is accessed to locate a pointer corresponding to the TN. In response to the query being a NP query, the pointer is used to locate NP data, and the NP data is returned. In response to the query being an ENUM query, the pointer is used to locate at least one URI and returning at least one uniform resource locators (URIs).

13 Claims, 11 Drawing Sheets

U.S. PATENT DOCUMENTS

| | | | |
|---|---|---|---|
| 7,027,582 | B2 | 4/2006 | Khello et al. |
| 7,054,652 | B2 | 5/2006 | Luis |
| 7,085,260 | B2 | 8/2006 | Karaul et al. |
| 7,274,683 | B2* | 9/2007 | Segal ............................ 370/352 |
| 7,286,839 | B2 | 10/2007 | McCann et al. |
| 7,457,283 | B2* | 11/2008 | Dalton et al. ................. 370/352 |
| 7,627,108 | B1* | 12/2009 | Enzmann et al. ........ 379/221.13 |
| 7,664,495 | B1 | 2/2010 | Bonner et al. |
| 7,693,135 | B2* | 4/2010 | Pershan ........................ 370/352 |
| 7,715,367 | B2 | 5/2010 | Nishida et al. |
| 7,746,864 | B1* | 6/2010 | Asawa et al. ................. 370/392 |
| 7,751,386 | B2 | 7/2010 | Kobayashi et al. |
| 7,787,445 | B2 | 8/2010 | Marsico |
| 7,996,541 | B2 | 8/2011 | Marathe et al. |
| 2001/0029182 | A1 | 10/2001 | McCann et al. |
| 2001/0055380 | A1 | 12/2001 | Benedyk et al. |
| 2002/0054674 | A1* | 5/2002 | Chang et al. ............. 379/207.02 |
| 2002/0095421 | A1 | 7/2002 | Koskas |
| 2002/0114440 | A1* | 8/2002 | Madour et al. ................. 379/219 |
| 2002/0122547 | A1* | 9/2002 | Hinchey et al. .......... 379/221.01 |
| 2002/0147845 | A1 | 10/2002 | Sanchez-Herrero et al. |
| 2002/0176562 | A1* | 11/2002 | Hao ......................... 379/221.13 |
| 2003/0007482 | A1* | 1/2003 | Khello et al. ................. 370/352 |
| 2003/0081754 | A1 | 5/2003 | Esparza et al. |
| 2003/0095541 | A1 | 5/2003 | Chang et al. |
| 2003/0128693 | A1 | 7/2003 | Segal |
| 2003/0220951 | A1 | 11/2003 | Muthulingam et al. |
| 2004/0003114 | A1 | 1/2004 | Adamczyk |
| 2004/0034699 | A1 | 2/2004 | Gotz et al. |
| 2004/0082332 | A1* | 4/2004 | McCann et al. .............. 455/445 |
| 2004/0243596 | A1 | 12/2004 | Lillqvist et al. |
| 2004/0246965 | A1 | 12/2004 | Westman et al. |
| 2005/0101297 | A1 | 5/2005 | Delaney et al. |
| 2005/0119017 | A1 | 6/2005 | Lovell, Jr. et al. |
| 2005/0182781 | A1 | 8/2005 | Bouvet |
| 2005/0251509 | A1 | 11/2005 | Pontius |
| 2005/0286531 | A1 | 12/2005 | Tuohino et al. |
| 2006/0002308 | A1 | 1/2006 | Na et al. |
| 2006/0034270 | A1 | 2/2006 | Haase et al. |
| 2006/0067338 | A1 | 3/2006 | Hua et al. |
| 2006/0136557 | A1 | 6/2006 | Schaedler et al. |
| 2006/0165068 | A1 | 7/2006 | Dalton et al. |
| 2006/0245573 | A1* | 11/2006 | Sheth et al. .............. 379/221.13 |
| 2006/0293021 | A1 | 12/2006 | Zhou |
| 2007/0061397 | A1 | 3/2007 | Gregorat et al. |
| 2007/0104184 | A1* | 5/2007 | Ku et al. ........................ 370/352 |
| 2007/0115934 | A1 | 5/2007 | Dauster et al. |
| 2007/0116250 | A1 | 5/2007 | Stafford |
| 2007/0121879 | A1 | 5/2007 | McGary et al. |
| 2007/0203909 | A1* | 8/2007 | Marathe ............................. 707/7 |
| 2007/0243876 | A1 | 10/2007 | Duan |
| 2007/0258575 | A1 | 11/2007 | Douglas et al. |
| 2008/0019356 | A1 | 1/2008 | Marsico |
| 2008/0109532 | A1 | 5/2008 | Denoual et al. |
| 2008/0112399 | A1 | 5/2008 | Cohen et al. |
| 2008/0130856 | A1 | 6/2008 | Ku et al. |
| 2008/0137832 | A1 | 6/2008 | Heinze et al. |
| 2008/0247526 | A1 | 10/2008 | Qiu et al. |
| 2008/0281975 | A1 | 11/2008 | Qiu et al. |
| 2008/0311917 | A1 | 12/2008 | Marathe et al. |
| 2009/0074174 | A1 | 3/2009 | Allen et al. |
| 2009/0103707 | A1 | 4/2009 | McGary et al. |
| 2009/0227276 | A1 | 9/2009 | Agarwal et al. |
| 2011/0098049 | A1 | 4/2011 | Gosnell et al. |

FOREIGN PATENT DOCUMENTS

| | | |
|---|---|---|
| EP | 0 944 276 A1 | 9/1999 |
| EP | 1 285 545 B1 | 10/2004 |
| KR | 2000-0037801 | 7/2000 |
| KR | 2003-0040291 A1 | 5/2003 |
| KR | 10-2007-0061774 | 6/2007 |
| WO | WO 97/33441 A1 | 9/1997 |
| WO | WO 99/11087 A2 | 3/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 03/005664 A2 | 1/2003 |
| WO | WO 2007/045991 A1 | 4/2007 |
| WO | WO 2007/092205 A2 | 8/2007 |
| WO | WO 2008/011101 A2 | 1/2008 |
| WO | WO 2008/073226 | 6/2008 |
| WO | WO 2008/157213 A2 | 12/2008 |

OTHER PUBLICATIONS

Final Official Action for U.S. Appl. No. 11/879,737 (Jun. 9, 2009).

Official Action for U.S. Appl. No. 11/364,759 (Mar. 30, 2009).

Commonly-assigned, co-pending U.S. Appl. No. 11/879,737 for "Methods, Systems, and Computer Program Products for Routing and Processing ENUM Queries," (Unpublished, filed Jul. 18, 2007).

Commonly-assigned, co-pending U.S. Appl. No. 11/364,759 for "Methods, Systems, and Computer Program Products for Indexing, Validating, Recovering, and Consolidating a Database Indexed by Range-Bound Numeric Data," (Unpublished, Filed Feb. 28, 2006).

Notification of Transmittal of the International Search Report and the Written Opinion of the International Searching Authority, or the Declaration for International Application No. PCT/US07/16370 (Sep. 15, 2008).

Offical Action for U.S. Appl. No. 11/879,737 (Sep. 15, 2008).

Notification Concerning Transmittal of International Preliminary Report on Patentablity for Internation Application No. PCT/US2007/002520 (Aug. 21, 2008).

Notification of Transmittal of the International Search Report and the Written Opinion of the International Searching Authority, or the Declaration for Internation Application No. PCT/US07/02520 (Mar. 3, 2008).

Supplementary European Search Report for European application No. 07810606.9 (Nov. 23, 2009).

Non-Final Official Action for U.S. Appl. No. 11/879,737 (Sep. 30, 2009).

Supplemental Notice of Allowability for U.S. Appl. No. 11/364,759 (May 24, 2011).

Notice of Allowance and Fee(s) Due for U.S. Appl. No. 11/888,907 (Apr. 1, 2011).

Notice of Allowance and Fee(s) Due for U.S. Appl. No. 11/364,759 (Mar. 22, 2011).

Chinese Official Action for Chinese Patent Application No. 200780030069.7 (Jan. 31, 2011).

"Ericsson Unified Number Portability," (Downloaded from the Internet on Jan. 24, 2011).

Communication pursuant to Article 94(3) EPC for European application No. 07810606.9 (Aug. 26, 2010).

Official Action for U.S. Appl. No. 11/364,759 (Aug. 16, 2010).

Tsou et al., "Realm-Based Redirection in Diameter," draft-ietf-dime-realm-based-redirect-03, RFC 3588, pp. 1-6.(Jul. 12, 2010).

Notice of Allowance and Fee(s) Due for U.S. Appl. No. 11/879,737 (Apr. 22, 2010).

Interview Summary for U.S. Appl. No. 11/364,759 (Apr. 21, 2010).

"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).

Communication pursuant to Article 94(3) EPC for European application No. 07810606.9 (Feb. 12, 2010).

Final Official Action for U.S. Appl. No. 11/364,759 (Jan. 21, 2010).

Chinese Official Action for Chinese Patent Application No. 200780012095.7 (Jan. 8, 2010).

Korhonen et al., "Clarifications on the Routing of Diameter Requests Based on the Username and the Realm," RFC 5729, pp. 1-9 (Dec. 2009).

"$3^{rd}$ Generation Partnership, Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).

Notification Concerning Transmittal of International Preliminary Report on Patentability for International Application No. PCT/US2007/024418 (Jun. 18, 2009).

Communication of European publication number and information on the application of Article 67(3) EPC for European Application No. 07810606.9 (Mar. 18, 2009).

Communication of European publication number and information on the application of Article 67(3) EPC for European Application No. 07809476.0 (Feb. 11, 2009).

"3rd Generation Partnership Project; Technical Specification Group Services and System Aspects; Policy and charging control architecture (Release 8)," 3GPP TS 23.203, V8.1.1, pp. 1-87 (Mar. 2008).

"IP Multimedia Subsystem," printout from wikipedia.org, Wikimedia Foundation, Inc. (May 29, 2007).

"HP OperCall Home Subscriber Server Software—Data Sheet", 4AA0-3360ENW Rev. 2, Hewlett-Packard Development Company, L.P. (Jul. 2006).

Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).

Schwarz, "ENUM Trial to Link Phone, Internet Addresses," (Mar. 22, 2005).

Peterson, "Telephone Number Mapping (ENUM) Service Registration for Presence Services," Network Working Group, RFC 3953 (Jan. 2005).

Jones, "The Definitive Guide to Scaling Out SQL Server," http://www.snip.gob.ni/Xdc/SQL/DGSOSSFinal.pdf (Retrieved on Aug. 16, 2010) (2005).

3GPP, "3$^{rd}$ Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

Peterson et al., "Using E.164 Numbers With the Session Initiation Protocol (SIP)," Network Working Group, RFC 3824, pp. 1-14 (Jun. 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," Packet, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Cisco, "Quality of Service Networks," Internetworking Technologies Handbook, Chapter 49, pp. 49-1-49-32 (Sep. 11, 2003).

Moodie, "Agilent acceSS7: White Paper," Agilent Technologies, pp. 1-14 (Apr. 1, 2003).

Foster et al., "Number Portability in the Global Switched Telephone Network (GSTN): An Overview," Network Working Group, RFC 3482 (Feb. 2003).

"Cisco IP Transfer Point," Cisco Systems, Inc., pp. 1-10 (Copyright 1992-2003).

"Cisco IP Transfer Point Multilayer Short Message Serivce Routing Solution," Cisco Systems, Inc., pp. 1-6 (Copyright 1992-2003).

"Cisco ITP MAP Gateway for Public WLAN Slm Authentication and Authorization," Cisco Systems, Inc., pp. 1-13 (Copyright 1992-2003).

Barry, "A Signal for Savings," Packet, Cisco Systems Users Magazine, vol. 14, No. 4, pp. Cover; 19-21; and 81 (Fourth Quarter 2002).

"Global. Implementation of ENUM: A Tutorial Paper," International Telecommunication Union, Telecommunication Standardization Union, Study Group 2, (Feb. 8, 2002).

"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

The attached email dated Oct. 20, 2001 and PowerPoint presentation dated Oct. 24, 2001 disclose an MSISDN-based auto-provisioning solution proposed by a customer of the assignee of the presend application.

"Agilent acceSS7 Business intelligence," Agilent Technologies, pp. 1-6 (Copyright 2001-Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

Mealling, "The Naming Authority Pointer (NAPTR) DNS Resource Record," Network Working Group, RFC 2915 (Sep. 2000).

Rockhold, "Or," Wireless Review, p. 22, 23, 26, 28, 30, 32, (Aug. 15, 2000).

"Topsail Beach-SS7 Over IP-" Cisco Systems, Inc., pp. 1-16 (Copyright 1999).

ETSI, "Digital Cellular Telecommunications Systems (Phase 2+); Support of Mobile Number Portability (MNP); Technical Realisation; Stage 2," Global System for Mobile Communications, p. 1-71, (1998).

Smith, "Number Portability Pileup," Telephony, p. 22, 24, 26, (Jan. 6,1997).

Jain et al., "Phone Number Portability for PCS Systems with ATM Backbones Using Distributed Dynamic Hashing," IEEE, vol. 15 (No. 1), p. 96-105, (Jan. 1997).

Heinmiller, "Generic Requirements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7-Signalling Connection Control Part," p. 11-16, (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, No. 1, p. 1-75, (Feb. 2, 1996).

ETSI, Digital Cellular Telecommunications System (Phase 2+); Milbe Application Part (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunications, p. 75-80, (Apr. 1995).

Anonymous, "Zeichengabesysteme-Eine neue Generation für ISDN und intelligente Netze," Zeichengabesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network Interface Specification (CCSNIS) Supporting SCCP and TCAP," Bell Communications Research, p. ii-xii, 1-1-C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1-8 (Publication Date Unknown).

"Configuring ITP Basic Functionally," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Neustar, "ENUM: Driving Convergence in the Internet Age," pp. 1-5 (Publication Date Unknown).

Notice of Abandonment for U.S. Appl. No. 11/364,759 (Jul. 7, 2011).

First Office Action for Chinese Patent Application No. 200780034804.1 (May 19, 2011).

Final Official Action for U.S. Appl. No. 11/635,406 (Nov. 30, 2011).

Interview Summary for U.S. Appl. No. 11/982,549 (Nov. 28, 2011).

Non-Final Official Action for U.S. Appl. No. 12/906,816 (Oct. 5, 2011).

Notice of Panel Decision from Pre-Appeal Brief Review for U.S. Appl. No. 11/635,406 (Oct. 3, 2011).

Non-Final Official Action for U.S. Appl. No. 12/906,998 (Sep. 21, 2011).

Final Official Action for U.S. Appl. No. 11/982,549 (Aug. 31, 2011).

Non-Final Official Action for U.S. Appl. No. 12/400,576 (Aug. 24, 2011).

Notice of Publication of Abstract for Indian Patent Application No. 6406/CHENP/2010 A (Jun. 17, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).

Jones et al., "Diameter Command Code Registration for the Third Generation Partnership Project (3GPP) Evolved Packet System (EPS)," Network Working Group, RFC 5516, pp. 1-5 (Apr. 2009).

Tschofenig et al., "Securing the Next Steps in Signaling (NSIS) Protocol Suite," International Journal of Internet Protocol Technology, vol. 1, pp. 1-14 (2006).

Stiemerling et al., "NAT/Firewall NSIS Signaling Layer Protocol (NSLP)," draft-ietf-nsis-nslp-natfw-06, pp. 1-70 (May 16, 2005).

Calhoun et al., "Diameter Base Protocol," RFC 3588, pp. 1-90 (Sep. 2003).

Official Action for U.S. Appl. No. 12/883,886 (Sep. 30, 2011).

* cited by examiner

| PEERING AGREEMENT DATABASE | |
|---|---|
| OCN A | OCN B |
| OCN B | OCN C |
| ... | ... |

FIG. 7A

| ORIGINATING OCN IDENTIFICATION DATABASE | |
|---|---|
| IP ADDRESS OR RANGE OF IP ADDRESSES | CALLING PARTY OCN |
| ... | ... |

FIG. 7B

METHODS, SYSTEMS AND COMPUTER PROGRAM PRODUCTS FOR ACCESSING NUMBER PORTABILITY (NP) AND E.164 NUMBER (ENUM) DATA USING A COMMON NP/ENUM DATA LOCATOR STRUCTURE

RELATED APPLICATIONS

This application claims the benefit of U.S. Provisional Patent Application Ser. No. 60/813,309 filed Jun. 13, 2006, the disclosure of which is incorporated herein by reference in its entirety.

TECHNICAL FIELD

The subject matter described herein relates to providing number portability (NP) and E.164 number (ENUM) services. More particularly, the subject matter described herein relates to methods, systems and computer program products for accessing number portability (NP) and E.164 number (ENUM) data using a common NP/ENUM data locator structure.

BACKGROUND ART

Number portability (NP) is a service that allows subscribers to change service providers and/or locations and keep the same telephone number. The term "number portability," as used herein, is intended to include local number portability (LNP), which refers to porting of landline telephone numbers, and mobile number portability, which refers to porting of mobile telephone numbers. In order to provide number portability service, carriers must maintain a database that translates dialed telephone numbers into exchange identifiers. As the number of subscribers increases, the size of number portability databases will also increase.

ENUM service refers to a service where the E.164-formatted telephone number of a subscriber is translated into one or more uniform resource identifiers (URIs). For example, the telephone number 19194605500 may be translated into 19194605500@tekelec.com. ENUM service allows subscribers to contact Internet protocol (IP) devices, such as IP phones, by dialing an E.164 telephone number. ENUM service requires a database that translates the E.164-formatted number to the corresponding URI(s). Like number portability, as the number of subscribers increases, the size of ENUM databases will also increase.

Current NP and ENUM databases are indexed, in whole or in part, by telephone numbers (TNs). For example, local number portability databases are indexed based on the first six digits of a telephone number, referred to as the numbering plan area code and exchange number (NPA-NXX). If a number within an NPA-NXX range is ported, its entry in the LNP database will contain a location routing number (LRN), which is a ten digit number corresponding to a ported-to end office.

When a ported TN is dialed, the call is routed to the appropriate end office using the LRN associated with the dialed TN. An LRN acts as a pointer to the ported-to end office and can point to switches located in a different geographical area or belonging to a different provider from the donor end office without changing the TN with which the LRN is associated. By maintaining databases containing TNs and any associated LRNs for ported numbers, carriers are able to provide NP service to their customers.

As stated above, NP database size is increasing due to an increased number of subscribers. One drawback of conventional NP databases is that as their size increases, their lookup time and storage requirement increases as well. For example, NP databases in the United States and other countries may now include hundreds of millions of entries. The resulting lookup times delay call setup. In addition, NP databases must be stored in memory, which increases data storage costs. Therefore, a need exists for reducing NP lookup times and storage requirements. Similar problems will occur for ENUM databases as the number of subscribers that require ENUM services increases.

Currently, NP and ENUM databases are separately maintained and accessed, even though some of the data required to access each database type is the same. That is, both ENUM and NP databases have data that can be accessed using a TN. Currently, TN data is duplicated for NP and ENUM data, resulting in wasted storage.

Conventional TN database lookups are typically implemented using binary tree data structures (b-trees). A binary tree data structure is a series of linked nodes wherein each node has at most two dependent nodes, called children. In order to locate an entry in a b-tree data structure, a search key, such as a called party telephone number, is compared with data associated with different branches in the tree. However, a binary tree data structure has several drawbacks.

One drawback associated with binary tree data structures is that as the number of ENUM database entries increases, the number of branches in the tree must also increase, thus increasing the search time as well. Another problem with using b-trees is that sophisticated balancing algorithms are required to ensure that the trees do not become unbalanced. Also, the size of the key in a b-tree structure may be greater than the size of data associated with a key. Another problem associated with b-tree structures is that they cannot be recovered in smaller data blocks since entries in a b-tree relate to each other as branches. Therefore, data recovery requires a reload of the entire database when data is identified as invalid.

In connecting VoIP calls that require ENUM queries, network traffic may be exchanged between administratively distinct networks through the use of peering agreements between the operators of the various networks. Peering agreements are typically contractual arrangements whereby routing information is exchanged between carriers for their mutual benefit. However, complications may arise given the wide variety of peering agreements and network implementations involved. For example, a subscriber on carrier A's network may initiate a voice over Internet protocol (VoIP) call to a subscriber on carrier Z's network. Carrier A may not have a peering agreement directly with carrier Z and thus would not be able to route the calling subscriber's call because it would not have the necessary routing information. However, carrier A may have a peering agreement with carrier B, who may have a peering agreement with carrier C, and so on. In this way, carrier A may be connected using a series of peering agreements, to carrier Z. Since no single carrier has a view of the entire chain, it may not be possible to complete VoIP calls that require multiple peering agreements. Alternatively, each carrier could maintain a copy of all peering agreements between other carriers to select the correct path for the call. However, peering agreements may be proprietary to the carriers involved in each agreement and thus may be unavailable to non-party carriers.

Accordingly, there exists a need for improved methods, systems, and computer program products for providing NP and ENUM services in a telecommunications network.

SUMMARY

According to one aspect, the subject matter described herein comprises methods, systems, and computer program products for accessing number portability (NP) and E.164 number (ENUM) data in a combined NP/ENUM database. One method includes receiving a query including a telephone number (TN). A common NP/ENUM data locator structure is accessed to locate a pointer corresponding to the TN. In response to the query being a NP query, the pointer is used to locate NP data, and the NP data is returned. In response to the query being an ENUM query, the pointer is used to locate at least one URI and returning at least one uniform resource locators (URIs).

According to another aspect, the subject matter described herein comprises a method for accessing ENUM data in a hierarchical ENUM database system. One method includes receiving an ENUM query. A common NP/ENUM data locator structure is accessed to locate data corresponding to the query. In response to the local data including a uniform resource locator (URI), returning the URI. In response to the local data including a location routing number (LRN), the LRN is used to access a numbering plan area code and exchange number (NPA-NXX) data structure.

The subject matter described herein may be implemented using a computer program product comprising computer executable instructions embodied in a computer readable medium. Exemplary computer readable media suitable for implementing the subject matter described herein include chip memory devices, disk memory devices, application specific integrated circuits, programmable logic devices, and downloadable electrical signals. In addition, a computer program product that implements a subject matter described herein may reside on a single device or computing platform or maybe distributed across multiple devices or computing platforms.

BRIEF DESCRIPTION OF THE DRAWINGS

The subject matter described herein will now be explained with reference to the accompanying drawings of which:

FIGS. 7A and 7B are data structure diagrams of exemplary data structures for a VoIP peering agreement database according to an embodiment of the subject matter described herein;

DETAILED DESCRIPTION

In order to provide greater efficiency in accessing, maintaining, and storing number portability (NP) and ENUM data, systems and methods are described herein for accessing NP and ENUM data using a common ENUM/NP data locator structure. First, a combined NP/ENUM database system is described that allows both NP and ENUM queries to be answered by a single system without maintaining duplicate TN data as in current systems. Second, a hierarchical ENUM database system providing ENUM translation services with greater data granularity than provided by current systems is described. Finally, a peering agreement database system interfacing with the combined NP/ENUM and hierarchical ENUM database systems and efficiently routing network traffic between carriers with peering agreements is described.

The methods for accessing NP and ENUM data using a common ENUM/NP data locator structure described herein can be implemented using any suitable hardware platform. Suitable platforms can include multiple or single hardware devices, examples of which include signal transfer points (STPs), service control points (SCPs), service switching points (SSPs), and servers. As used herein, a server is defined as a platform including hardware and software for providing database services to clients. A server may respond to received queries from a client.

Figure 1A:
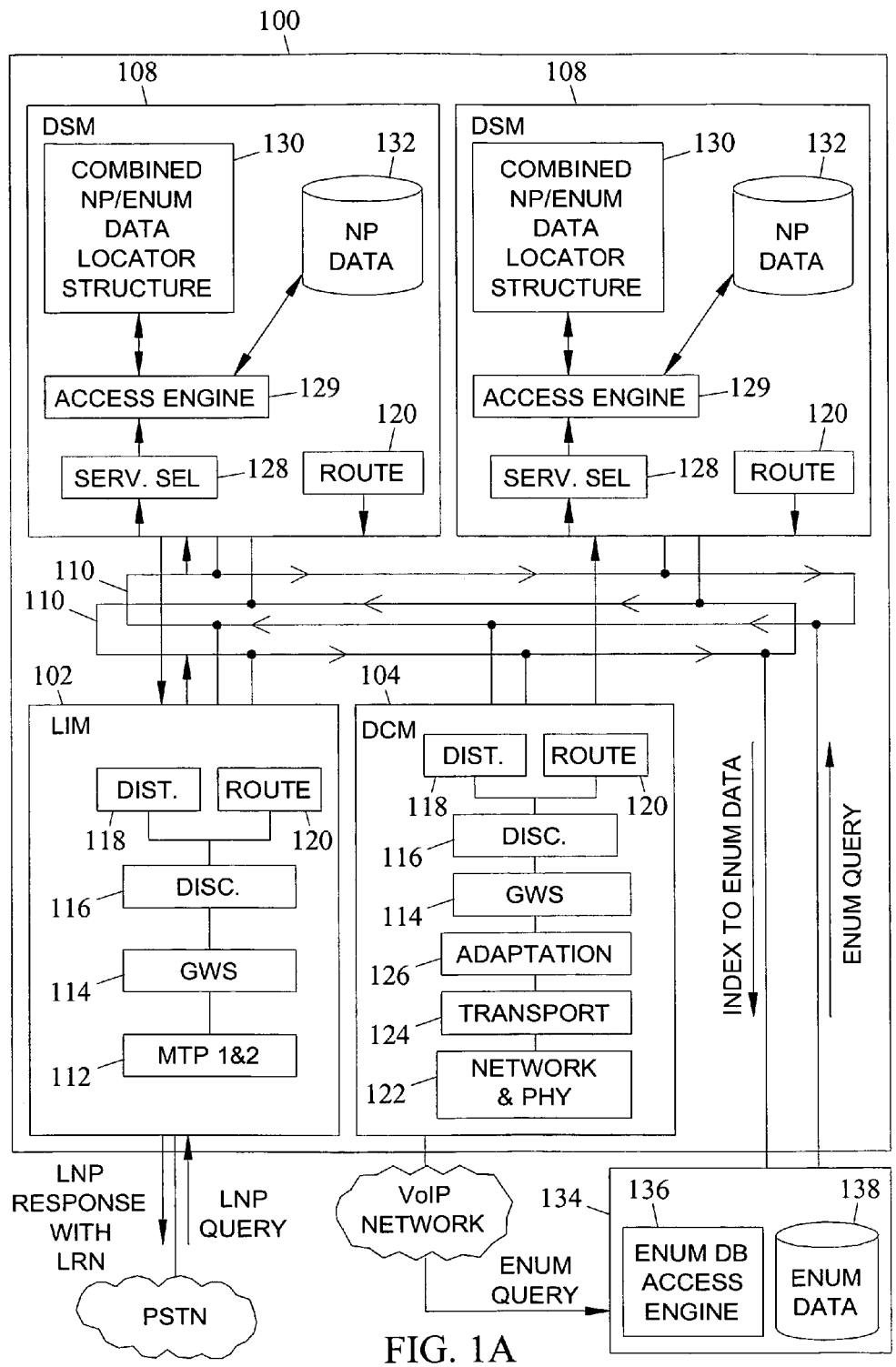
FIG. 1A is a block diagram of an exemplary system for providing access to NP an/or ENUM data using a common ENUM/NP data locator structure according to an embodiment of the subject matter described herein.

In one implementation, NP data may be maintained in its traditional location such as on an STP or an SCP, and ENUM data may be located on a standalone server. A common NP/ENUM data locator structure may be located on the STP. FIG. 1A illustrates such an embodiment. More particularly, FIG. 1A is a block diagram illustrating an exemplary internal architecture of an STP that includes a common NP/ENUM data locator structure and NP database according to an embodiment of the subject matter described herein. FIG. 1 also illustrates a block diagram of an exemplary internal architecture of a server that includes an ENUM database and ENUM database access engine according to an embodiment of the subject matter described herein.

Referring to FIG. 1A, STP 100 includes a plurality of internal processing modules 102-108 connected to each other via a counter-rotating, dual-ring bus 110. Processing modules 102-108 may each include an application processor and associated memory for implementing a telecommunications signaling function. In addition, each processing module may include a communications processor for communicating with other processing modules via bus 110.

In the illustrated example, processing module 102 comprises a link interface module (LIM) for interfacing with SS7 signaling links. Link interface module 102 includes a message transfer part (MTP) level 1 and 2 function 112, a gateway screening function 114, a discrimination function 116, a distribution function 118, and a routing function 120. MTP level 1 and 2 function 112 performs MTP level 1 and 2 operations, such as error correction, error detection, and sequencing of SS7 signaling messages. Gateway screening function 114 screens incoming SS7 signaling messages based on one or more parameters in the messages. Discrimination function 116 determines whether a received SS7 signaling message should be distributed to another processing module within STP 100 for further processing or whether the message should be routed over an outbound signaling link. Discrimination function 116 forwards messages that are to be distributed for internal processing to distribution function 118. Distribution function 118 forwards the messages to the appropriate internal processing module. Routing function 120 routes messages that are required to be routed based on MTP level 3 information in the messages.

Processing module 104 comprises a data communications module (DCM) for sending and receiving signaling messages via IP signaling links. DCM 104 includes a network and physical layer function 122, a transport layer function 124, an adaptation layer function 126, and layers 112-120 described with regard to LIM 102. Network and physical layer function 122 performs network and physical layer functions for sending and receiving messages over IP links. For example, function 122 may implement Internet protocol (IP) over Ethernet. Transport layer function 124 implements transport layer functions. For example, transport layer function 124 may implement transmission control protocol (TCP), user datagram protocol (UDP), or stream control transmission protocol (SCTP). Adaptation layer function 126 performs operations for adapting signaling messages, such as SS7 signaling messages, for transport over an IP network. Adaptation layer function 126 may implement using any of the IETF adaptation layer protocols, such as M3UA, M2PA, SUA, TALI, or other suitable adaptation layer protocol. Functions 114-120 perform the operations described above for the correspondingly numbered components of LIM 102.

Processing modules 108 are database service modules (DSMs) for providing database services for received signaling messages. Each DSM 108 includes a service selection function 128 for determining the type of database service to be applied to a received signaling message. If NP service is selected, an access engine 129 uses a combined NP/ENUM data locator structure 130 to obtain a pointer or index to NP data in an NP database 132. If the selected service is ENUM service, access engine 129 may access NP/ENUM data locator structure 130, obtain a pointer or index to ENUM data, and return the pointer or index to an ENUM database. After the database access has been performed, routing function 120 may route the received signaling message or a response to a received signaling message to its destination.

Combined NP/ENUM data locator structure 130 may be used to implement the indexing methods described herein for accessing data in database 132. In addition, data locator structure 130 may be used to perform validation of database access results at access time based on data stored in database 132.

DSMs 108 each contain common NP/ENUM data locator structure 130 and NP database 132. Each DSM 108 is connected to other processing modules located on STP 100 via bus 110 as well as server 134. However, NP queries can be processed entirely on STP 100 in the embodiment illustrated in FIG. 1.

Server 134 includes an ENUM database 138 and an ENUM database access engine 136. Server 134 may be connected via a communications link to STP 100 for receiving and transmitting data related to accessing data stored in ENUM database 138. Additionally, server 134 may be connected to an Internet protocol (IP) communications network for receiving ENUM queries, such as queries necessary for connecting VoIP calls.

In one example illustrated in FIG. 1A, an NP query is transmitted via the PSTN and received by STP 100, where it is forwarded to common NP/ENUM data locator structure 130 and obtains a pointer to an LRN located in NP database 132. The pointer is used to locate an LRN in NP database 132, if any exists, that corresponds to the queried TN. The LRN may be returned in the query response. The query response containing the located LRN value may be transmitted back to the PSTN device that initiated the NP query. From the perspective of a device transmitting a NP query, processing NP queries at an STP containing a combined NP/ENUM data locator structure as described herein is indistinguishable from current methods. However, the use of a combined NP/ENUM data locator structure allows carriers to add ENUM functionality without adding duplicate TN data, which is expensive to store and maintain.

In a second example illustrated in FIG. 1A, an ENUM query is transmitted via IP network and received by server 134. Server 134 forwards the ENUM query to access engine 129, which accesses data locator structure 130 and extracts and returns a pointer or index to ENUM database 138. The pointer is used to access ENUM database 138, which returns the corresponding URI values as the query response. The query response containing the located URI values is then transmitted back to the VoIP device that initiated the ENUM query. Again, from the perspective of a device transmitting an ENUM query, processing ENUM queries at a system utilizing a combined NP/ENUM data locator structure as described herein is indistinguishable from current methods.

Figure 1B:
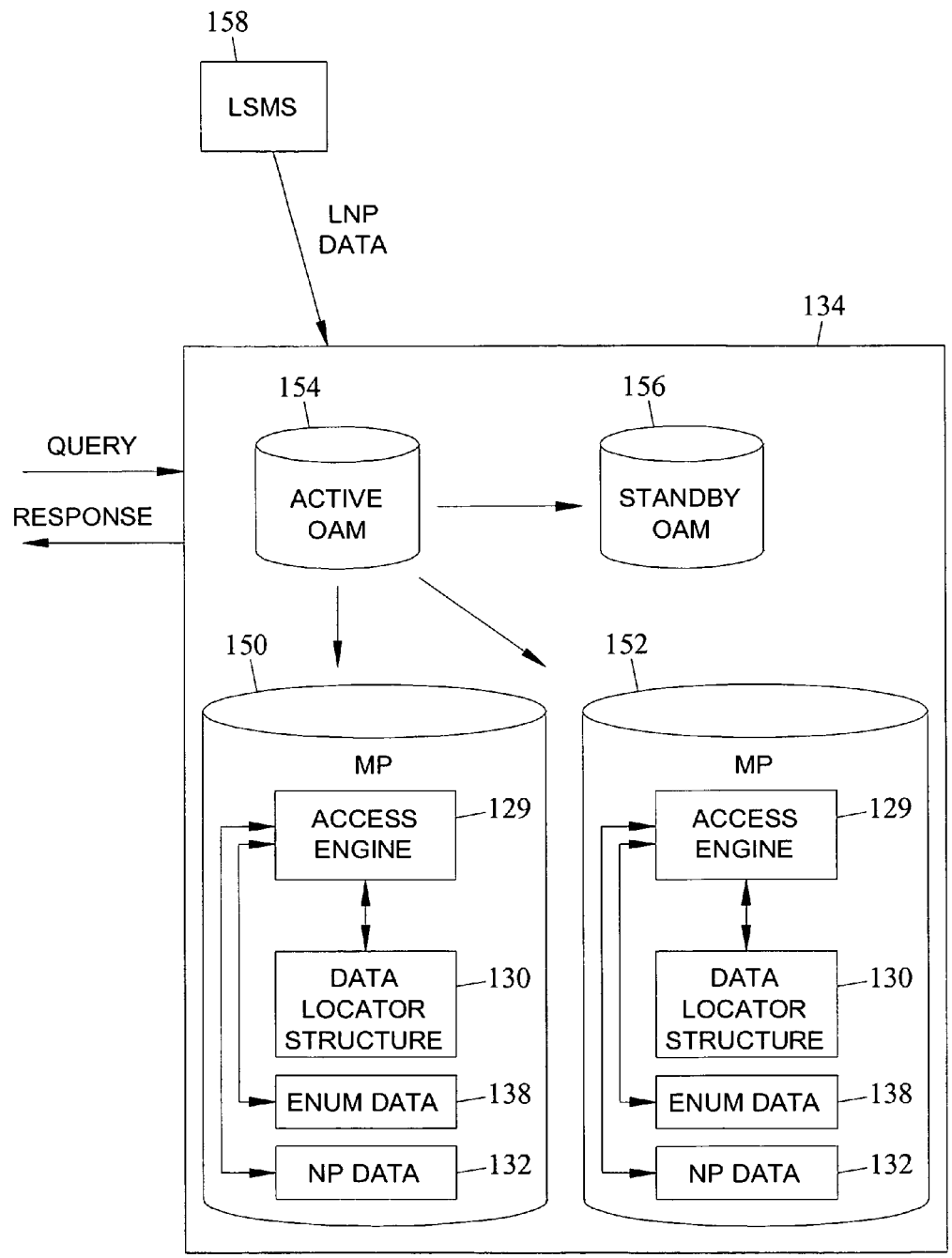
FIG. 1B is a block diagram of an alternate system for providing access to NP an/or ENUM data using a common ENUM/NP data locator structure according to an embodiment of the subject matter described herein.

In the example illustrated in FIG. 1A, NP data and a common NP/ENUM data locator structure are located on an STP, and ENUM data is located on an ENUM platform or server. In an alternate implementation, the NP data, the ENUM data, and the common NP/ENUM data locator structure may be located on a server, as illustrated by FIG. 1B. In FIG. 1B, server 134 may include message processors 150 and 152 and active and standby OA&M modules 154 and 156. Each message processor 150 may include memory for storing number portability data 132, ENUM data 138, and data locator structure 130. In addition, each message processor 150 and 152 may include access engine 129 for identifying a type of query (i.e., ENUM or NP), for accessing data locator structure 130 at obtaining an index, and for accessing either ENUM data 138 or NP data 132 using the index and the query type. The access engine 129 may return a response to the querying node.

Active OA&M 154 may perform provisioning of memory managed by message processors 150 and 152. A standby OA&M 156 may perform provisioning in the event that active OA&M 154 fails. LNP data may be obtained from a centralized authority, such as local service management system (LSMS) 158. ENUM data may be obtained from a similar service or from a provisioning interface of an operator. In the illustrated example, message processors 150 and 152 are assumed to be identically provisioned and may operate in a load sharing manner. An exemplary hardware platform suitable for implementing server 134 is the TekServer platform available from Tekelec of Morrisville, N.C.

Figure 2:
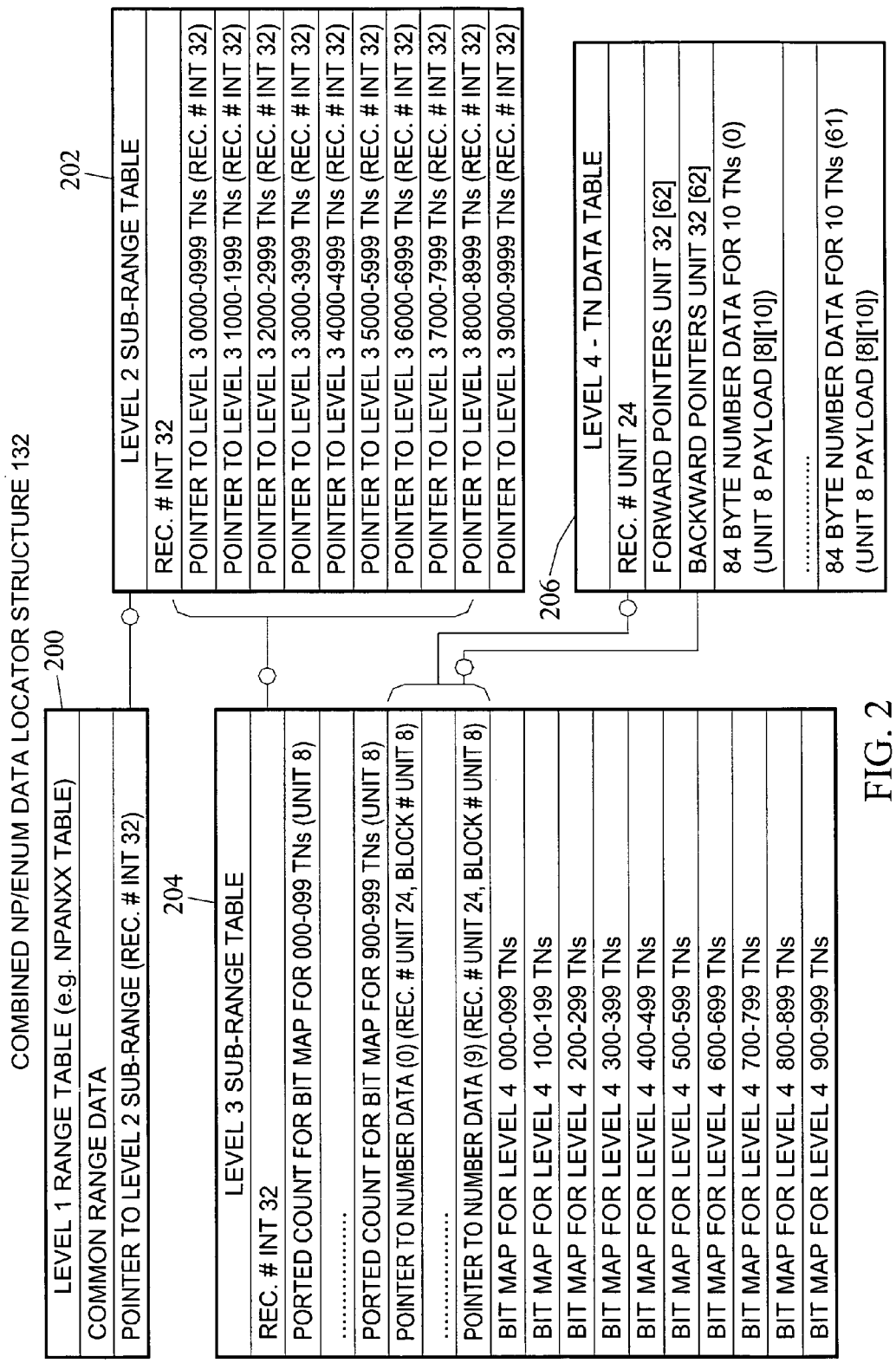
FIG. 2 is a data structure diagram illustrating an exemplary common ENUM/NP data locator structure for locating ENUM and/or NP data according to an embodiment of the subject matter described herein.

FIG. 2 is a data structure diagram illustrating an exemplary common NP/ENUM data locator structure 130 for locating NP/ENUM data according to an embodiment of the subject matter described herein. The illustrated data structure efficiently maps inputted data, such as a TN, to desired corresponding data by breaking up large data sets into smaller and more manageable data set and linking them with pointers. Referring to FIG. 2, common NP/ENUM data locator structure 130 includes a level 1 range table 200, a level 2 sub-range table 202, a level 3 sub-range table 204, and a level 4 TN data table 206. Tables 200-206 illustrated in FIG. 2 will be explained with regard to number portability data. However, it should be noted that the structure of these tables can apply to other types of data, such as ENUM data including URIs and OCNs.

In the illustrated example, level 1 range table 200 may include entries indexed by NPA-NXX values. For illustrative purposes, a single entry is shown. In the illustrated example, the entry includes a pointer to a record in level 2 sub-range table 202. Each entry in level 2 sub-range table 202 is indexed by ranges of 1000 numbers from 0000 to 9999, corresponding to the last four digits of a telephone number used as a search key. Each entry in level 2 sub-range table 202 includes a pointer to an entry in level 3 sub-range table 204 for the corresponding range. Level 3 sub-range table 204 includes entries indexed by ranges of 100 numbers from 000 to 999 corresponding to the last three digits of a telephone number. Each entry in level 3 sub-range table 204 includes a bitmap, a ported count, and a pointer to level 4 data table 206. The ported count for each entry indicates the number of TNs within each range that are ported. The bitmap includes bits that indicate the presence or absence of data for a key corresponding to each bit. The pointer points to the block of data in level 4 TN data table 206 corresponding to each range in level 3 sub-range table 204. Level 4 TN data table 206 includes the data desired to be accessed. For example, for number portability data, level 4 TN data table 206 may include LRN data. In addition, level 4 data table 206 may include a portion of a search key, such as the numbering plan area code and exchange number (NPA-NXX) value, so that results of a database access can be validated at access time.

Figure 3:
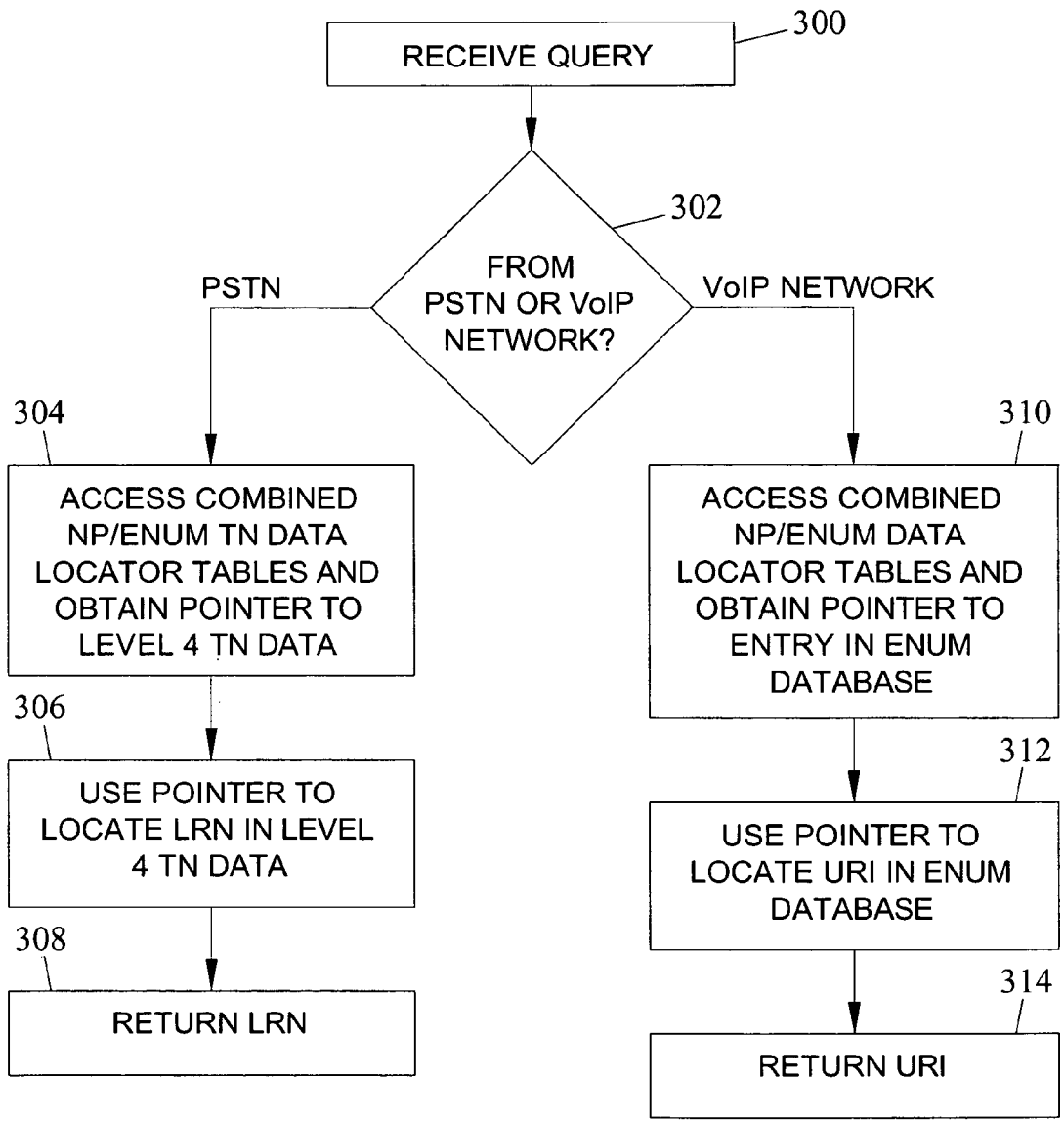
FIG. 3 is a flow chart of a process for processing NP and ENUM queries using a common ENUM/NP data locator structure according to an embodiment of the subject matter described herein.

FIG. 3 is a flow chart of a method for processing NP and ENUM queries using a common NP/ENUM data locator structure according to an embodiment of the subject matter described herein. Referring to FIG. 3, in step 300, an NP or ENUM query is received. A common NP/ENUM data locator structure is accessed to locate a pointer corresponding to the telephone number (TN) in steps 304 or 310, depending on whether the query is an NP query from the PSTN or an ENUM query from a VoIP network. In response to the query being a NP query, the pointer is used to locate NP data in step 306, and the NP data is returned in step 308. In response to the query being an ENUM query, the pointer is used to locate at least one URI in step 312, and at least one uniform resource locators (URIs) is returned in step 314.

Figure 4:
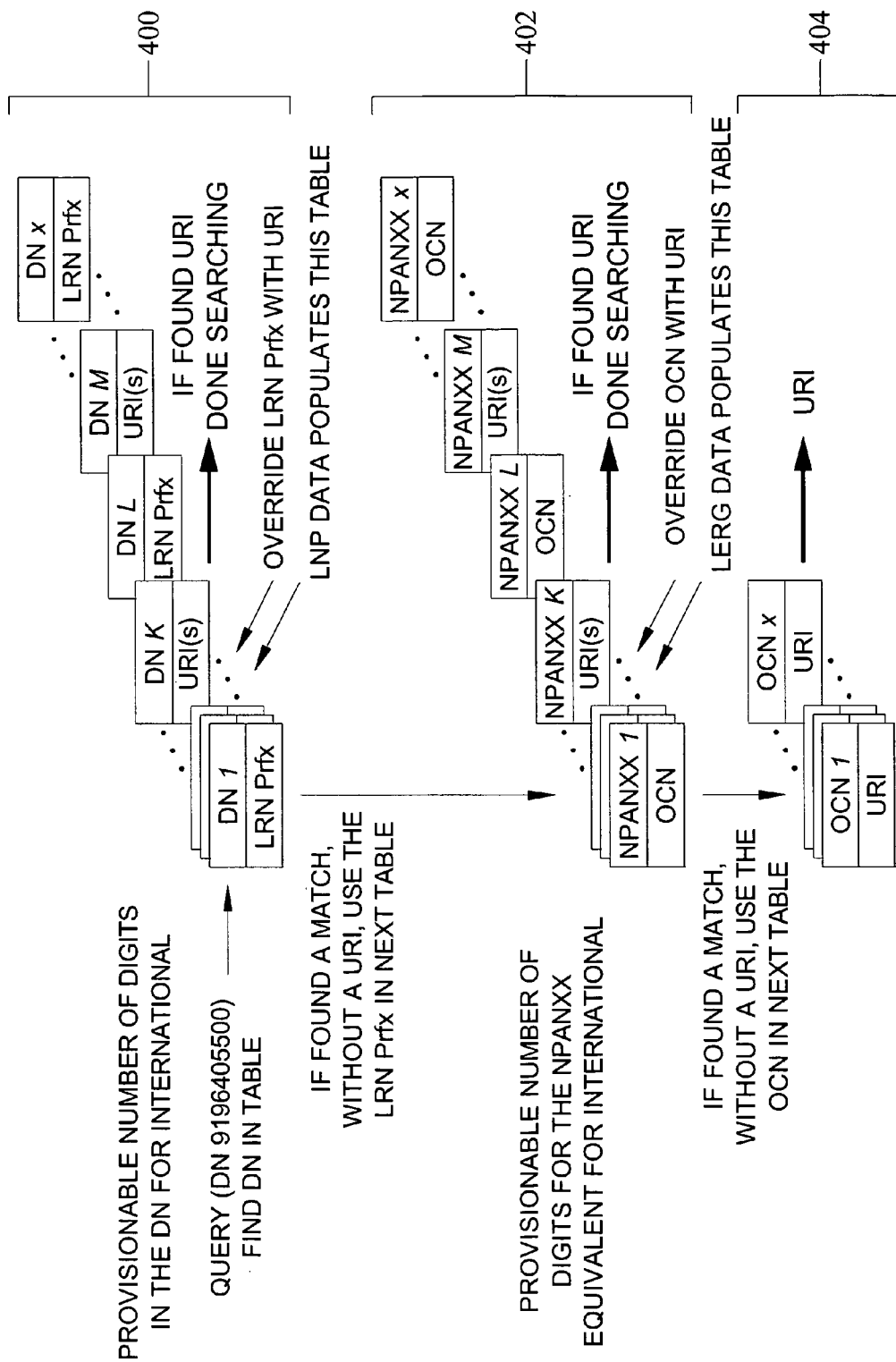
FIG. 4 is a data structure and process flow diagram illustrating an exemplary structure for a hierarchical ENUM database and a method for locating ENUM data using the data structure according to an embodiment of the subject matter described herein.

According to another aspect of the subject matter described herein, a hierarchical ENUM data structure and a method for locating ENUM data using the same is provided. FIG. 4 is a data structure and process flow diagram illustrating an exemplary structure for a hierarchical ENUM database and a method for accessing ENUM data using such a structure according to an embodiment of the subject matter described herein. The data structure illustrates a logically tiered structure including three tiers, a first tier 400, a second tier 402, and a third tier 404. First tier 400 may include TN or directory number (DN) data which is mapped to LRN and URI data via indexes. First tier 400 may use a data structure, such as that illustrated in FIG. 2 to map the TN data to the URIs. The URI data located in first tier 400 may be subscriber level data and is associated with an individual TN for a subscriber.

When an ENUM query is received at first tier 400, a TN is extracted from the query and inputted into the level 1 range table illustrated in FIG. 2. Utilizing the series of tables and pointers described in FIG. 2 according to the subject matter described herein, pointers are obtained pointing to locations of LRN and URI data in separate LRN and URI data structures. If a first URI is located, or if both an LRN and a first URI are located, then the value of the first URI is returned. However, the first URI may also point to a second URI also associated with a TN. URI values may be linked together in a chain using pointers. This allows additional URI values to be easily added or deleted from the list of values associated with a particular TN. Alternatively, if an LRN is the only value located in first tier 400, the LRN value is inputted into the second tier data structure.

In FIG. 4, second tier 402 includes NPA-NXX data which is mapped to operating carrier number (OCN) and URI data. The URI data located in the second tier may be carrier level data that is associated with NPA-NXX values. For example, a large carrier may own several TNs across a wide geographical area comprising multiple NPA-NXX values. Each NPA-NXX identifies the point of presence (POP) within the total coverage area of the carrier. Thus, second tier URI data is associated with both a carrier and a POP, such as carrier_A.northeast.com or 919.carrier_A.com.

When an LRN is passed from first tier 400 to second tier 402, the method of traversing a series of tables and pointers as described above may be repeated for different values. In second tier 402, the first six digits of an LRN received from first tier 400 may correspond to an NPA-NXX value in second tier 402. If a first URI value is located using the LRN, or if both an OCN and a first URI value are located, the first URI value is returned. Alternatively, if only an OCN value is the only value located in second tier 402 associated with the NPA-NXX value of a particular TN, the OCN value is passed to third tier 404.

Third tier 404 includes OCN data which is mapped to URI data. The URI data located in third tier 404 also comprises carrier level data. However, third tier URI data is separated by carrier, and therefore possesses the lowest granularity of the three tiers. For OCN values passed from the second tier, URIs are located in a third URI data table. One or more URIs exist for all OCNs because the total number of OCNs is small and changes very little compared to NP data located in the first tier, and therefore requires very little effort to maintain accurate data. In one exemplary implementation, a hierarchical ENUM database may be implemented on a traditional telecom platform, such as an STP and a server.

Figure 5:
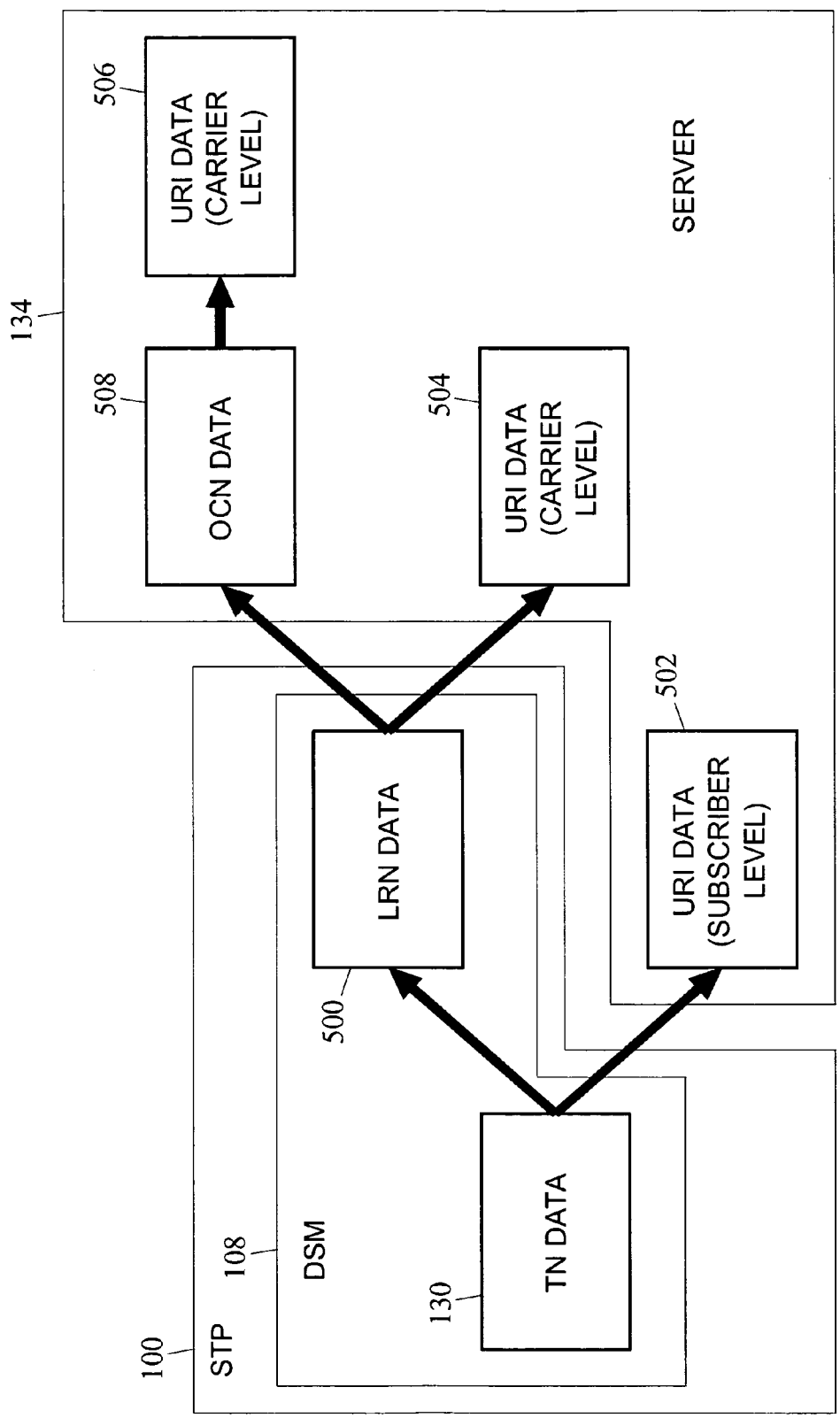
FIG. 5 is a block diagram illustrating an exemplary implementation of a hierarchical ENUM database according to an embodiment of the subject matter described herein.

FIG. 5 is a block diagram illustrating an exemplary implementation of a hierarchical ENUM database according to an embodiment of the subject matter described herein. Referring to FIG. 5, TN data 130 and LRN data 500 are located on DSM card 108 of STP 100. URI data 502, 504, and 506 as well as OCN data 508 are located on server 134. TN data 130 may include the indexes and tables illustrated in FIG. 2. LRN data 500 may include LRN values that either endpoints for NP database lookups or indexes to further levels of the hierarchy. URI data 502 may include subscriber level URI data. URI data 504 may include carrier level URI data. URI data 506 may include carrier level URI data indexed by OCM data 508.

Figure 6:
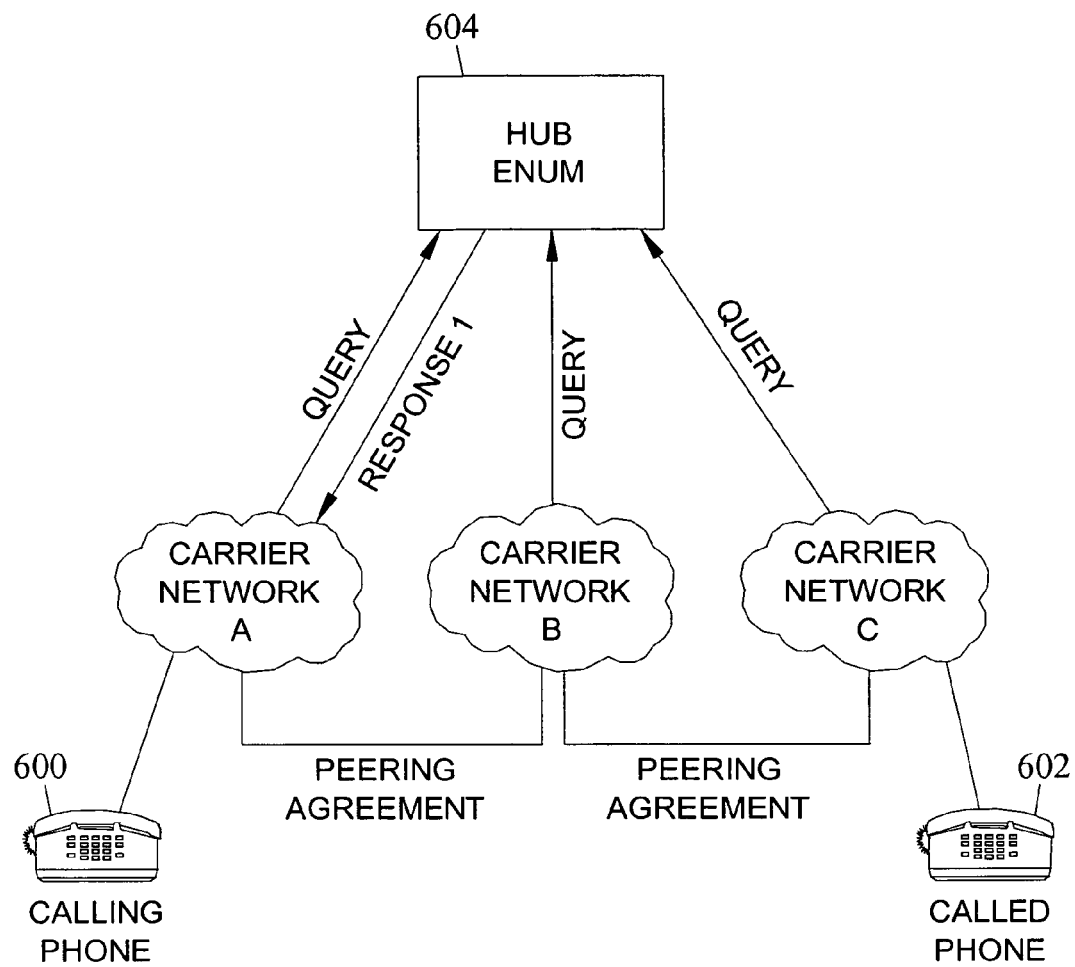
FIG. 6 is a block diagram illustrating exemplary nodes that may implement VoIP peering using an ENUM data locator structure with VoIP peering data according to an embodiment of the subject matter described herein.

According to another aspect of the subject matter described herein, the data structures and access methods described above may be extended to implant VoIP peering agreements. FIG. 6 is a block diagram illustrating exemplary network that may implement VoIP peering using an ENUM data locator structure with VoIP peering data according to an embodiment of the subject matter described herein. Referring to FIG. 6, calling party 600 is a subscriber of carrier A's network and initiates a voice over Internet protocol (VoIP) call to called party 602 who is a subscriber of carrier C's network. Carriers A and B are connected via a peering agreement, as are carriers B and C. In order to route the VoIP call from calling party to called party, carrier A queries a hub ENUM database 604, which transmits an ENUM response to carrier A. Hub ENUM database 604 may implement the process flow and structure of FIG. 4 and may also include additional tables for implementing VoIP peering agreements, which will be described below. The response from ENUM database 604 allows carrier A to route the call to carrier B. Carrier B then queries hub ENUM database 604 and receives a different ENUM response based on carrier B's peering agreements rather than carrier A's. This allows carrier B to route the call to carrier C. Carrier C then queries hub ENUM server in order to route the call to the particular subscriber within its network.

FIGS. 7A and 7B are data structure diagrams of exemplary data structures for a VoIP peering agreement database that may be included in hub ENUM database 604 according to an embodiment of the subject matter described herein. When a calling party belonging to a first carrier calls a party belonging to another carrier, difficulties may arise in connecting the call. Peering agreements are agreements between carriers to help connect calls between their networks. In FIG. 7A, a peering agreement database includes a first table mapping OCN values of different carriers to each other, where each mapping corresponds to a peering agreement between carriers. In order to determine the OCN of the carrier serving the calling party, a separate table may be maintained, that maps calling party information, such as source IP address, to calling party OCN. Such a table is illustrated in FIG. 7B. In FIG. 7B, an IP address or range of IP addresses of calling party is mapped to a calling party OCN. The result of an access to the table illustrated in FIG. 7B is an OCN, which may be used to access the peering agreement table of FIG. 7A to determine which carriers have peering agreements. Once the OCN with which a particular carrier has a peering agreement is located, that OCN can be used to locate a URI for routing the call to the particular carrier.

Figure 8:
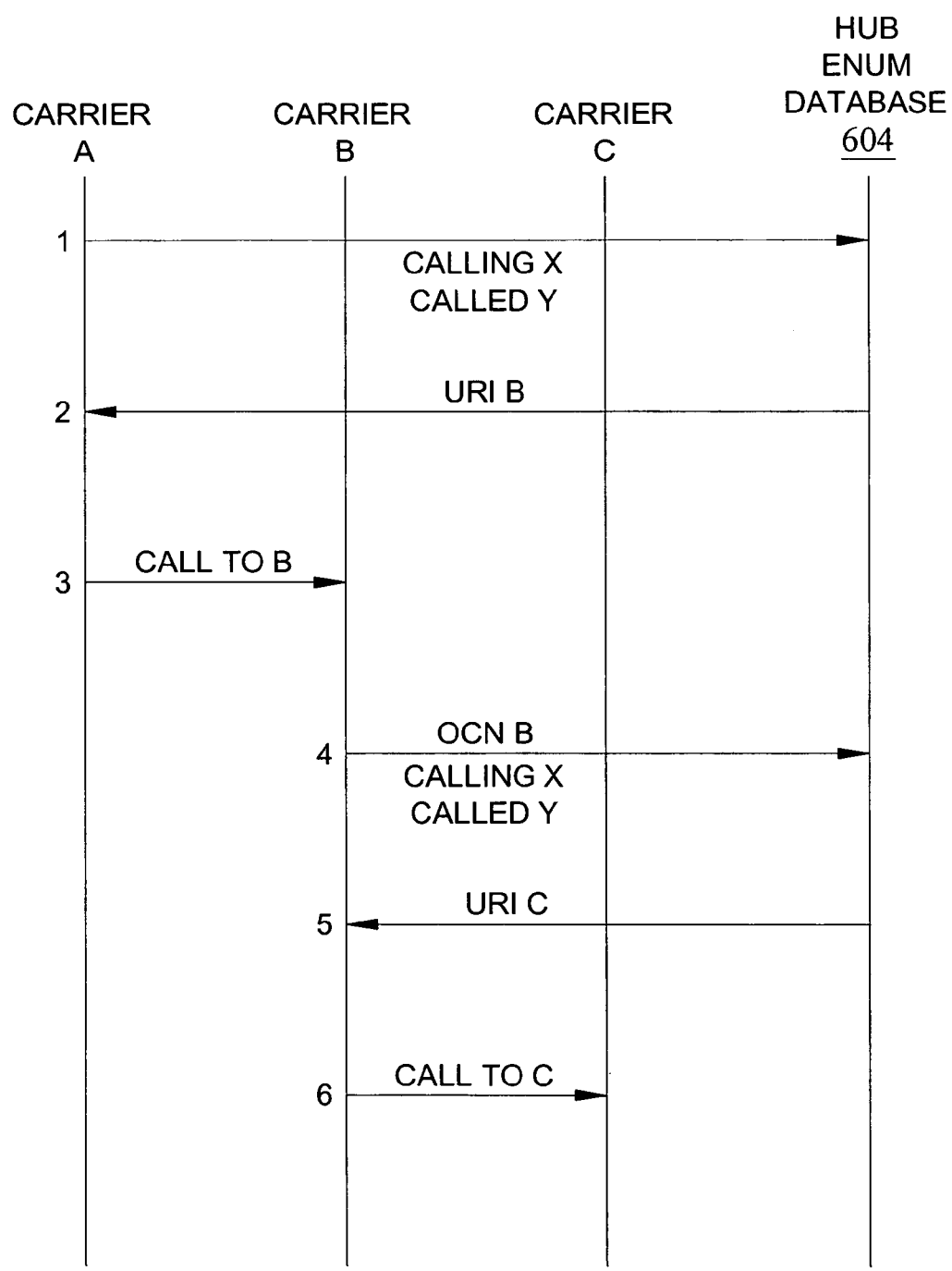
FIG. 8 is a call flow diagram illustrating exemplary messages exchanged in implementing VoIP peering using an ENUM data locator structure with VoIP peering data according to an embodiment of the subject matter described herein.

FIG. 8 is a call flow diagram illustrating exemplary messages exchanged in implementing VoIP peering using an ENUM data locator structure with VoIP peering data according to an embodiment of the subject matter described herein. Referring to FIG. 8, the process illustrated is identical to that described by FIG. 6 in which calling party 600 is a subscriber of carrier A's network, and initiates a voice over Internet protocol (VoIP) call to called party 602 who is a subscriber of carrier C's network. Carriers A and B are connected with a peering agreement, as are carriers B and C. In line 1 of the cell flow diagram, carrier A queries hub ENUM database 604. Hub ENUM database 604 uses the calling party's IP address to identify the OCN of the calling party, which, in this example, is the OCN of carrier A. The OCN of carrier A is then used to access the peering agreement table of FIG. 7A to determine the OCN of the carrier with which carrier A has a peering agreement. In this example, that carrier is carrier B. Hub ENUM database 604 uses the OCN of carrier B to locate a URI corresponding to carrier B. In line 2 of the call flow diagram, hub ENUM database 604 returns the URI for carrier B to carrier A. In line 3 of the call flow diagram, carrier A routes the call to the carrier B. In line 4 of the call flow diagram, carrier B queries hub ENUM database 604. Since carrier B has a peering agreement with carrier C, and carrier C has the necessary information to route the call to called party 602, in line 5 of the call flow diagram, hub ENUM database 604 returns the URI of carrier C. In line 6 of the call flow diagram, the call is routed to carrier C. Carrier C then routes the call to called party 602.

Figure 9:
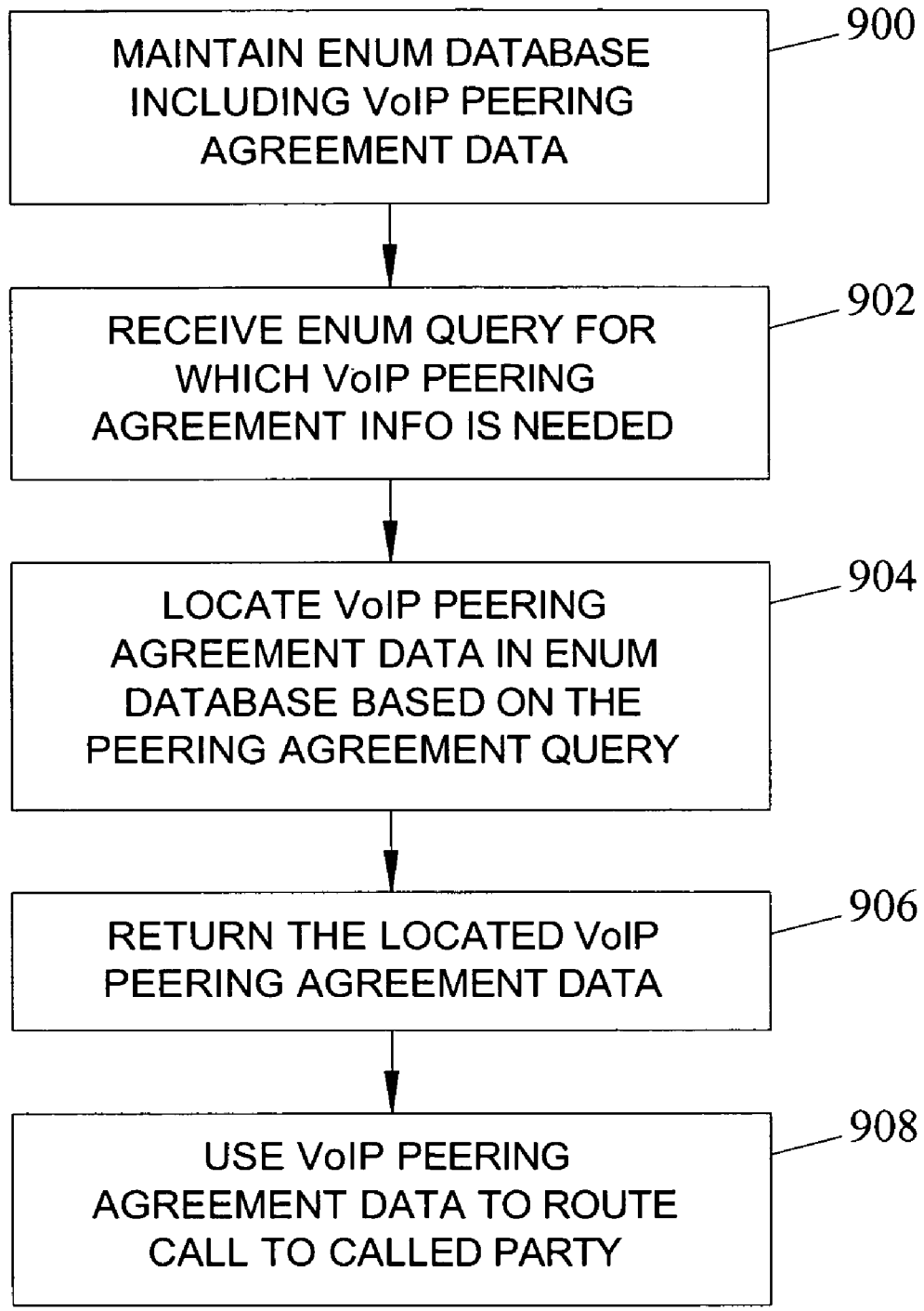
FIG. 9 is a flow chart illustrating an exemplary process for implementing VoIP peering using an ENUM data locator structure with VoIP peering data according to an embodiment of the subject matter described herein.

FIG. 9 is a flow chart illustrating an exemplary process for implementing VoIP peering using an ENUM data locator structure with VoIP peering data according to an embodiment of the subject matter described herein. Referring to FIG. 9, in step 900 an ENUM database with peering agreement data, such as illustrated in FIGS. 7A and 7B, is maintained.

In step 902, an ENUM query for which voice over IP peering agreement information is needed is received. An example of an ENUM query for which VoIP peering agreement information is needed is an ENUM query from a carrier associated with a calling party for a call that cannot be directly routed to the called party because the calling and called party networks do not have direct peering agreements with each other.

In step 904, voice over IP peering agreement data is located in the ENUM database based on the peering agreement query. Locating the peering agreement data may include using the source IP address of the calling party to locate the OCN of the carrier serving the calling party and using the OCN of the carrier serving the calling party to determine a carrier with which the calling party's carrier has a peering agreement. In block 906, the VoIP peering agreement data is returned. In block 908, the VoIP peering agreement data is used to route the call to the called party. Block 908 may include one or more subsequent queries to the ENUM database to locate the URI corresponding to the called party.

In the some of the examples described above, NP data is accessed before accessing ENUM data to first determine whether a number is ported. In an alternate implementation, it may be desirable to access ENUM data first, for example, to first try to route the call to a 3G network. If the ENUM data access fails to locate a matching record, an NP lookup may be performed to route the communication to the correct 2G destination.

Figure 10:
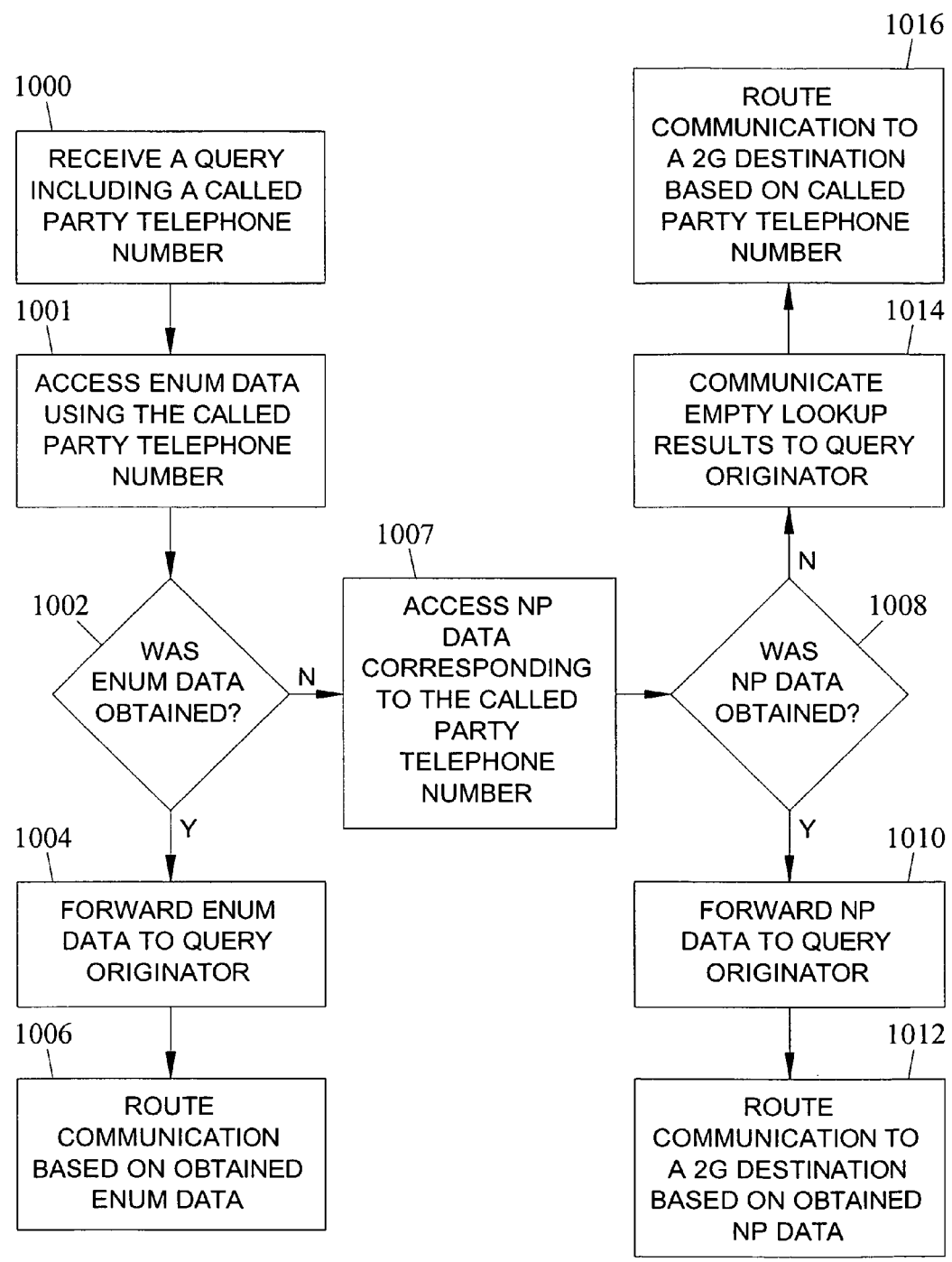
FIG. 10 is a flow chart illustrating an exemplary process for routing communications using ENUM and NP data according to an embodiment of the subject matter described herein.

FIG. 10 is a flow chart illustrating an exemplary process for routing calls using ENUM NP data according to an embodiment of the subject matter described herein. Referring to FIG. 10, in step 1000, a query including a called party TN is received. The query may be an ENUM query received by STP 100 or by standalone server 134. In step 1001, ENUM data is accessed using the called party TN. The ENUM data may be structured according to any of the examples described above, and the access may be an index-based access as described above. In step 1002, it is determined whether any ENUM data (i.e., at least one URI corresponding to the TN) is obtained in the access. If ENUM data is obtained, control proceeds to step 1004, where the ENUM data is forwarded to the query originator and to block 1006, where the communication is routed based on the obtained ENUM data.

In block 1002, if ENUM data is not located, NP data is accessed using the called TN in step 1007. In step 1008, it is determined whether NP data (i.e., a location routing number (LRN)) corresponding to the dialed TN is located in the NP data access. If NP data corresponding to the called TN is located, control proceeds to step 1010, where the NP data is returned to the query originator. In block 1012, the communication is routed to a 2G destination based on the NP data. If NP data corresponding to the called TN is not located, control proceeds to block 1014, where the empty lookup results are communicated to the query originator. In block 1016, the communication is routed to a 2G destination using the original called party TN.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for accessing number portability (NP) and E.164 number (ENUM) data in a NP and ENUM database system, the method comprising:
    (a) receiving a query including a telephone number (TN), wherein the query includes one of a NP query for requesting NP data and an ENUM query for requesting ENUM data;
    (b) accessing a single NP and ENUM data locator structure to locate a pointer corresponding to the TN, wherein the single NP and ENUM data locator structure includes an index structure shared by the NP data and the ENUM data;
    (c) in response to the query being a NP query, using the pointer to locate NP data, and returning the NP data; and
    (d) in response to the query being an ENUM query, using the pointer to locate at least one uniform resource indicator (URI), and returning the at least one URI.

2. The method of claim 1 wherein accessing a single NP and ENUM data locator structure includes accessing a single NP and ENUM data locator structure located on the same hardware platform as the LNP and ENUM data.

3. The method of claim 1 wherein accessing a single NP and ENUM data locator structure includes accessing a single NP and ENUM data locator structure located on a different hardware platform from at least one of the LNP and ENUM data.

4. The method of claim 1 wherein accessing a single NP and ENUM data locator structure includes accessing a single NP and ENUM data locator structure located on a signal transfer point (STP).

5. The method of claim 1 wherein accessing a single NP and ENUM locator structure includes accessing a single NP and ENUM data locator structure located on a server.

6. The method of claim 1 wherein accessing a single NP and ENUM data locator structure includes accessing a single NP and ENUM data locator structure located on a service control point (SCP).

7. The method of claim 1 wherein accessing a single NP and ENUM data locator structure includes using the TN to traverse a plurality of tables corresponding to digits in the TN, wherein each of the tables corresponds to ranges of TN digits.

8. The method of claim 7 wherein accessing the plurality of tables includes determining whether ranges of digits in the TN correspond to ranges of TN digits for entries in each of the tables.

9. A number portability (NP) and E.164 number (ENUM) database system comprising:
    (a) a single NP and ENUM data locator structure including a plurality of range tables linked using pointers, wherein one of the tables includes a pointer to data corresponding to the pointer, wherein the single NP and ENUM data locator structure includes an index structure shared by the NP data and the ENUM data; and
    (b) an access engine for receiving a query, wherein the query includes one of a NP query for requesting NP data and an ENUM query for requesting ENUM data, for determining whether the query is an NP or an ENUM query, for accessing the single NP and ENUM data locator structure and locating a pointer corresponding to the TN in the query, for in response to the query being an NP query, using the pointer to access NP data to locate an LRN corresponding to the query, and, for, in response to the query being an ENUM query, using the pointer to access ENUM data and locate a URI corresponding to the query.

10. The system of claim 9 wherein the single NP and ENUM data locator structure is located on a signal transfer point (STP).

11. The system of claim 9 wherein the single NP and ENUM data locator structure is located on a service control point (SCP).

12. The system of claim 9 wherein the single NP and ENUM data locator structure is located on a server.

13. A computer program product comprising computer executable instructions embodied in a non-transitory computer readable medium for performing steps when executed by a computer comprising:
    (a) receiving a query including a telephone number (TN), wherein the query includes one of a NP query for requesting NP data and an ENUM query for requesting ENUM data;
    (b) accessing a single NP and ENUM data locator structure to locate a pointer corresponding to the TN, wherein the single NP and ENUM data locator structure includes an index structure shared by the NP data and the ENUM data;
    (c) in response to the query being a NP query, using the pointer to locate NP data, and returning the NP data; and
    (d) in response to the query being an ENUM query, using the pointer to locate at least one uniform resource indicator (URI), and returning at the least one URI.

* * * * *